March 15, 1927.　　　　J. H. BRANT　　　　1,621,150
TRACK SCALE TRIG LOOP
Filed July 31, 1925
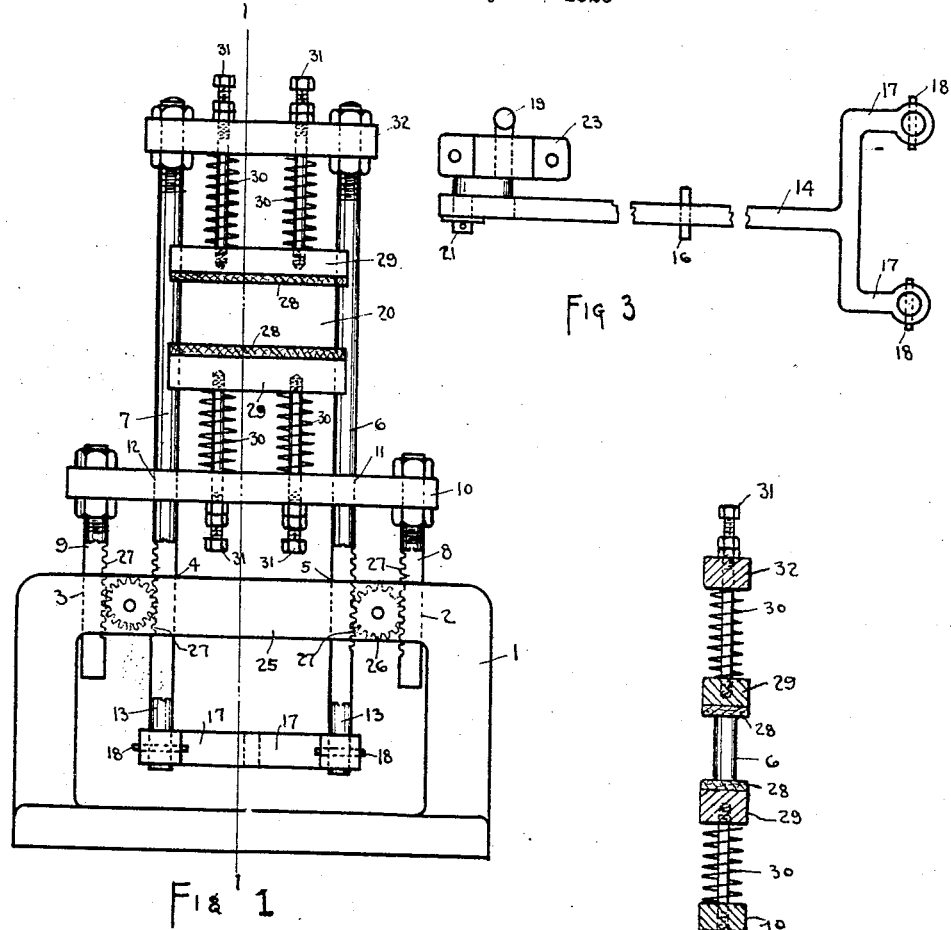
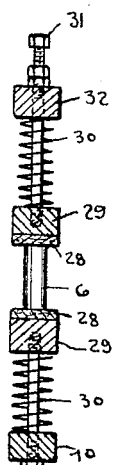
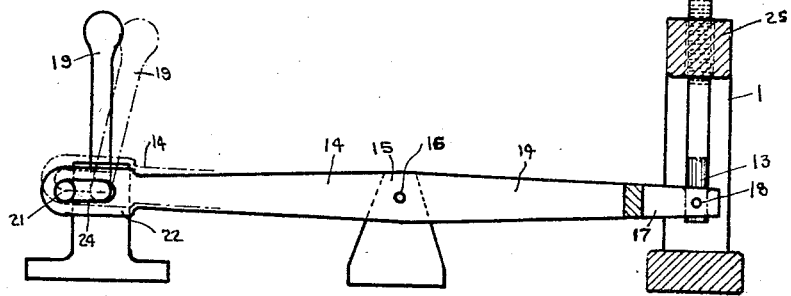
Jessie H. Brant
INVENTOR.
BY
ATTORNEY.

Patented Mar. 15, 1927.

1,621,150

UNITED STATES PATENT OFFICE.

JESSIE H. BRANT, OF YOUNGSTOWN, OHIO.

TRACK-SCALE TRIG LOOP.

Application filed July 31, 1925. Serial No. 47,354.

This invention relates to improvements in scales and more particularly to railway track scales where the scales are subjected to sudden and terrific strain.

The principal object of this invention is to provide an improved trig loop in order to secure the weighing beam in a balanced position when the weight is subjected to the scales. Where the weighing beam is allowed to swing up and down when car or other weight is placed upon the scales, certain injury is done to the balanced fulcrums of the scales because the weight is not carried on the extreme summit of the fulcrum point.

Another object of the invention is to provide cushioned stops situated above and below the weighing beam in an adjustable and movable manner.

With the foregoing and other objects in view, which will appear as the description proceeds, the invention resides in the combination and arrangement of parts, and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:

Figure 1 is an end elevation of the device.

Figure 2 is a side elevation of Figure 1 taken on line 1—1.

Figure 3 is a detailed view of Figure 2.

By referring to Figure 1, it will be seen that I have provided a support member 1, provided with vertical openings 2, 3, 4 and 5. The vertical openings 4 and 5 support in a slidable manner rods 6 and 7. The vertical openings 2 and 3 carry vertical rods 8 and 9 in a slidable manner. The upper ends of the rods 8 and 9 carry an adjustable beam 10 provided with openings 11 and 12 through which slide the vertical rods 6 and 7.

By referring to Figures 2 and 3, it will be seen that the lower ends 13 of the vertical rods 6 and 7 are pivotally connected to a bifurcated fulcrum beam 14, fulcrumed at point 15 upon a tilting member 16. The bifurcated ends 17 are pivoted by means of pivot pins 18 to the lower ends 13 of the vertical rods 6 and 7.

In operating the device, the operator moves the lever 19 in an up-right position when he wishes to open a trig loop 20. When he wishes to secure a weighing beam within the trig loop 20, he moves the lever 19 inwardly as shown on the dotted line, thereby, moving an eccentric arm 21 upwardly carrying the outer end 22 of the bifurcated fulcrum beam 14. The eccentric arm 21 and the lever 19 are held in position by means of boxing 23. The eccentric arm 21 moves in a slot 24 as the lever 19 is moved back and forth. When the lever 19 is moved inwardly as shown on the dotted position, in Figure 2, the bifurcated arms 17 are forced downwardly carrying the vertical rods 6 and 7 downwardly. Secured to an upper horizontal beam 25, I have provided cogwheels 26 positioned between the vertical rods 6 and 8, and 7 and 9, functioning with rack teeth 27 formed on the side of each of the vertical rods 6, 7, 8 and 9, in such a manner as to function with the cogwheels 26. It will be seen that as the vertical rods 6 and 7 are moved downwardly, the cogwheels 26 functioning with the vertical rods 8 and 9 cause the same to be moved upward. This action closes in the trig loop 20 securing the weighing beam against flexible resilient cushion members 28 which are secured to trig blocks 29 which are cushioned by means of coil springs 30. The coil springs 30 are held in position by adjustable bolts 31 which are held in position by means of the adjustable beam 10 and an adjustable beam 32.

What I claim is:—

1. In a device of the class described, an upper and lower trig block, coil springs positioned back of said trig blocks for the purpose of cushioning said trig blocks, means for causing said trig blocks to move against a weighing beam thereby securing said beam in a level position, a lever controlled means for operating said trig blocks, substantially as described for the purpose set forth.

2. In a device of the class described, a support member carrying two sets of slidably maintained vertical rods, an adjustable beam secured at the upper ends of each set of slidably maintained vertical rods, trig blocks slidably secured within one set of said vertical rods, coil springs cushioning said trig blocks and means for securing the same, lever controlled means for causing said trig blocks to close in upon the upper and lower edge of a weighing beam, substantially as described for the purpose set forth.

In testimony whereof I affix my signature.

JESSIE H. BRANT.